United States Patent

[11] 3,553,360

[72] Inventors Edwin H. Land; John J. McCann, Cambridge, Mass.
[21] Appl. No. 699,496
[22] Filed Jan. 22, 1968
[45] Patented Jan. 5, 1971
[73] Assignee Polaroid Corporation Cambridge, Mass. a corporation of Delaware
Continuation-in-part of application Ser. No. 620,580, Feb. 8, 1967, now abandoned. This application Jan. 22, 1968, Ser. No. 699,496

[54] METHOD AND SYSTEM FOR IMAGE REPRODUCTION BASED ON SIGNIFICANT VISUAL BOUNDARIES OF ORIGINAL SUBJECT
17 Claims, 6 Drawing Figs.

[52] U.S. Cl. .......... 178/6.8, 178/5.2
[51] Int. Cl. .......... H04m 9/02, H04m 3/00
[50] Field of Search .......... 178/5.2A, 6BWR, 6.8, 7.2, (Inquired), 7.2B&E, 15ACE; 328/145; 333/14

[56] References Cited

UNITED STATES PATENTS

| | | | |
|---|---|---|---|
| 2,980,769 | 4/1961 | Holloway | 179/15ACE |
| 3,288,930 | 11/1964 | Johnson | 325/46 |
| 2,865,984 | 12/1958 | Moe | 178/5.2A |
| 3,128,333 | 4/1964 | Loughlin | 178/5.2A |
| 3,249,690 | 5/1966 | Schubert | 178/6.8 |
| 3,294,896 | 12/1966 | Young Jr. | 178/6BW |
| 3,361,872 | 1/1968 | Sweeney | 178/6.8 |

*Primary Examiner*—Robert L. Griffin
*Assistant Examiner*—Donald E. Stout
*Attorneys*—Brown and Mikulka and William D. Roberson

ABSTRACT: In a television system, a subject is scanned to detect brightness ratios across visually significant boundary lines or edges between different areas of the subject. A signal is developed which represents the sequential multiplication of edge ratios of brightness detected on opposite sides of boundaries. This signal is employed to control the relative brightness of different areas of the image on the face of a television viewing screen. Applications to color television and other types of image reproduction systems are discussed.

INVENTORS
Edwin H. Land
and
John J. McCann
BY Brown and Mikulka
and
William D. Roberson
ATTORNEYS INVENTORS
Edwin H. Land
and
John J. McCann
BY Brown and Mikulka
and
William D. Roberson
ATTORNEYS INVENTORS
Edwin H. Land
and
John J. McCann
BY Brown and Mikulka
and
William D. Roberson
ATTORNEYS

METHOD AND SYSTEM FOR IMAGE REPRODUCTION BASED ON SIGNIFICANT VISUAL BOUNDARIES OF ORIGINAL SUBJECT

This application is a continuation-in-part of copending Pat. application Ser. No. 620,580, filed on Feb. 8, 1967, now abandoned.

BRIEF SUMMARY OF THE INVENTION

This invention concerns methods and systems for the reproduction of images, that is to say, for the production of images based upon an original subject which may itself be an image. The invention may have wide use in fields such as photography, document duplication and television. The invention will be described principally in connection with a novel television system and method.

A prevalent concept of image formation, widely accepted, is that in any image which reasonably reproduces an original subject, the discrete areas which comprise the image should in general characterize the absolute brightnesses of the equivalent discrete areas in the original subject. It seems common sense that any point-to-point variations in brightness in the original subject should determine the point-to-point variations in brightness of the image. This is not to say that the entire dynamic range of an original scene or subject should necessarily be reproduced in the image thereof. An original subject may have a brightness variation, from the brightest to the darkest portions of the subject, of a thousand to one, sometimes more, while the tonality of the ultimate image may have to be compressed into a ten-to-one scale with a nonlinear relationship. Nevertheless, it is generally held that any particular point on the brightness scale of the image should correspond to a single point on the brightness scale of the original subject. This notion has exerted a basic and powerful influence on image production systems and methods.

For example, in a typical television system a subject is scanned continuously while a signal is developed which represents a continuous record of the absolute brightness of each successive increment scanned on the subject. In color television systems a color signal generally represents a continuous brightness record of the brightness of the original subject in terms of one of its color components, each color component corresponding to a different predetermined spectral range of wavelengths. Thus, typical television systems, as well as other types of image reproducing systems, rely upon the approach of continuously monitoring the brightnesses in each incremental area of the subject to produce an image which contains similar gradations in brightness from increment to increment.

It can be shown, however, that in a normally endowed individual the visual mechanisms which are responsible for registering and interpreting images are not guided or influenced primarily by the absolute brightness of different areas of the subject viewed. Consider, as an example, a scene which includes both a white cat and a black one. The black cat is seen in brilliant sunlight while the white cat reclines in the shade. If comparative photometric measurements are taken of the light received from both cats, it may be found that more light is coming from the black cat than from the white one. In other words, the black cat is brighter than the white cat. Nevertheless, the black cat is perceived as black and the white cat is as white.

Consider another type of image situation. A plain white surface, displayed against a complex and variegated background, is illuminated from the side by a nearby source of light such that a brightness gradient across the surface results. Photometric measurements may reveal that a discrete area on the surface nearest to the light source reflects 10 times as much light as is reflected from an equal area on the same surface more distant from the light source. Nevertheless, the entire white surface may appear almost uniformly white. Furthermore, as in the example of the cats, the less brightly illuminated parts of the white surface may reflect less light to the eye than is reflected from equivalent areas on a dark object close to the light source. Still the white surface appears, in all of its parts, lighter than the dark object.

Such image situations illustrate that visual perceptions are not determined principally by the brightness of objects in a field of view. Ordinary visual impressions convey information concerning the characteristics of specific objects which may be quite independent of the amount of light received from those objects. This invention rests on the proposition that the nature of a perceived image is governed by the interrelationship of all the ratios between brightness levels on opposite sides of significant visual boundaries or edges. Such edges or boundaries generally appear in large numbers in any particular scene. In the example given above of the black and white cats, the elemental areas which may comprise the background of one cat are related to the background of the other cat by sequences of visually significant bounded areas.

The visual mechanism which permits the observer to see the white cat as lighter than the black cat, despite the objective photometric data that the black cat is brighter than the white cat, responds to the edge information between all areas of the total subject. It is submitted that the visual mechanism or complex of the observer utilizes ratios of brightness across these visually significant boundaries or edges and, on the basis of all these edge ratios, assigns to the various areas of the subject a rank order on a lightness scale. The lightness scale does not in general correspond to the rank order of the various areas in terms of brightness. For the purpose of assigning the rank order of lightness to the objects which it sees, the visual complex may ignore gradual brightness gradients across a surface, as in the case of the nonuniformly illuminated white surface discussed above, and respond to the aggregate edge or boundary information. It is as if a boundary or edge between a lighter area and a darker area contains an instruction to the visual complex by which the observer sees the relative lightnesses of the areas in a manner quite independent of the brightness of the light actually received from any particular points in each area.

It is on the basis of observations and postulates such as these that the present invention is founded. In a television system, which represents one of the possible embodiments of the invention, an original subject is scanned, preferably according to a predetermined line-scan program, for the purpose of detecting significant visual boundaries for edge information. During the scanning operation, an electrical edge-ratio signal is developed which is a function primarily of this edge information. This signal represents the ratios between the levels of brightness at closely spaced points on opposite sides of significant visual boundary lines of the subject. The edge-ratio signal, transmitted by suitable means to an image display means is employed to control the reproduction of an image of the original subject. In the reproduction of the image, the brightnesses of the individual areas which comprise the image are determined and controlled in accordance with the information contained in the edge-ratio signal. In such a system, the resulting image does not necessarily contain all the brightness gradation of the original subject. The resulting image is, however, a representation of the original image in terms of comparative lightness instead of absolute brightness. Because the image-characterizing signal which is developed is not a continuous record of all the intensities of light in the original subject, a system such as this has the capability of significantly reducing bandwidth requirements in the transmission of image-bearing information.

DETAILED DESCRIPTION OF THE DRAWINGS

Figures 1, 2:
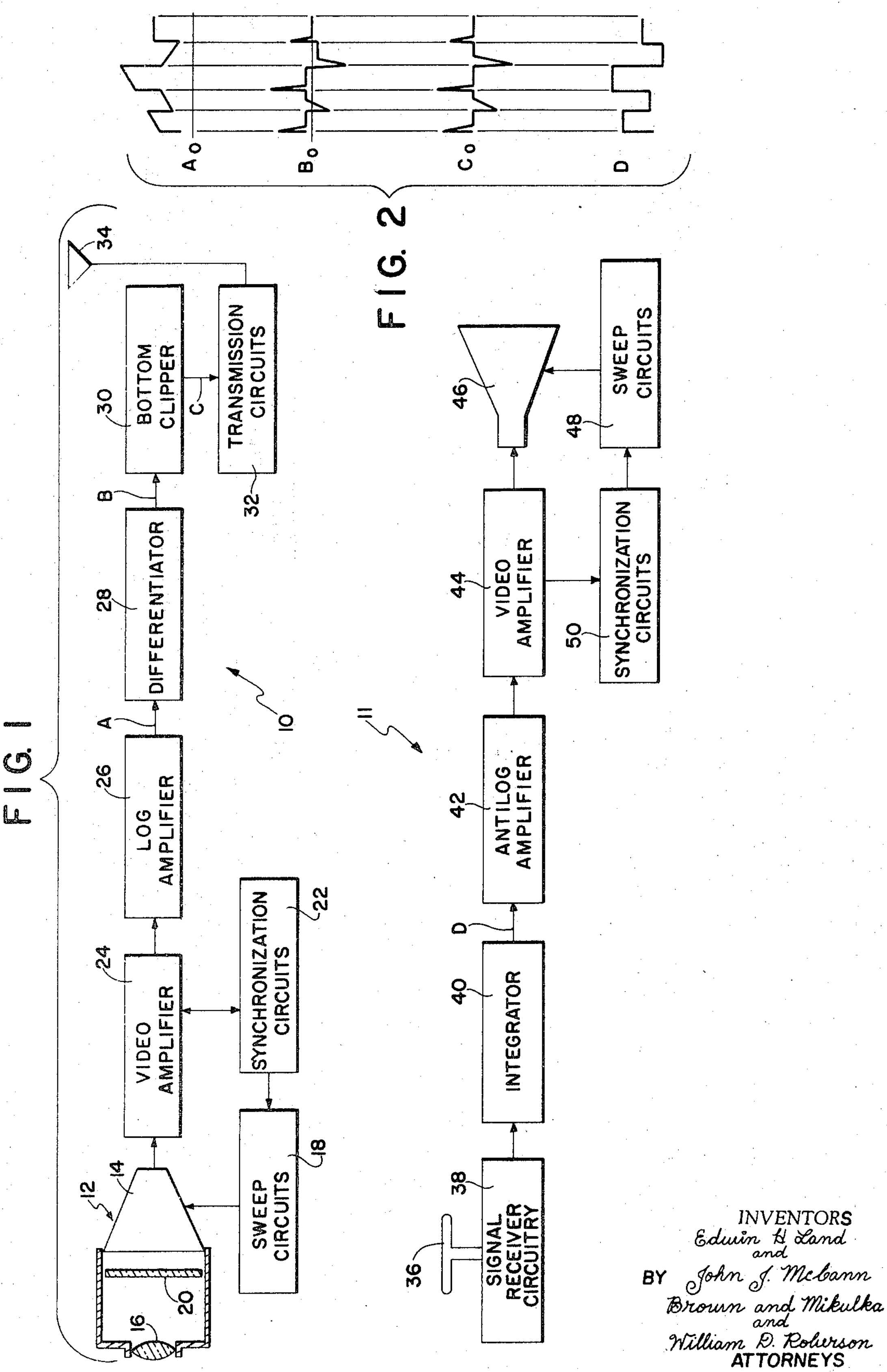
FIG. 1 is a diagrammatic illustration of a television transmission and receiving system embodying the principles of this invention.
FIG. 2 represents relationships between waveforms produced at various points in the system illustrated in FIG. 1.

The television system shown in FIG. 1 comprises a transmitter portion 10 and a receiver portion 11. In the transmitter a television camera 12 is shown as including an image orthicon 14 upon the face of which an image of a subject is focused by the lens system represented at 16. The image orthicon 14, which may be of any known type, is scanned according to a predetermined line-scan program under the control of sweep circuits 18 to produce a programmed signal representing a continuous record of the brightness of successive increments of the scanned subject. A filter 20, such as one which passes red, green or blue portions of the spectrum, may be interposed before the face of the image orthicon. In such case, a signal would be obtained which is a record representing the brightness of the subject in terms of whichever color component is selected. A color television system might employ a separate filtered image orthicon to detect each of two or more color components. In such a color system the outputs of the separate orthicons could be matrixed or otherwise combined to produce a composite signal from which the color information could subsequently be extracted. Although for simplicity only one image orthicon is shown, the television camera illustrated diagrammatically in this FIG., as well as its associated equipment, may be taken as representative in a broader sense of one color channel in a color television camera system.

The sweep circuits 18 need not control the scan of the subject in accordance with scanning programs of the type currently employed in commercial television systems. Indeed, for the purpose of this invention it may be advantageous in some cases to scan the subject in such a way that the scanning beam never leaves the image area. This can be accomplished by scanning in a zigzag fashion from left to right, then from right to left and, similarly, from top to bottom and from bottom to top. Alternatively, the subject may be scanned spirally from the center outwardly and then from the outside inwardly toward the center. Preferably, the linear velocity of the scanning beam should be the same in all portions of the subject.

The sweep circuits 18 are controlled by synchronization circuits 22 which may also combine keying impulses with the output waveform from the image orthicon for the purpose of synchronizing the ultimate formation of the reproduced image.

The video signal produced by image orthicon 14 is a continuous record of the brightness of the subject as determined during the line-scan program. After amplification by video amplifier 24, the video signal may next be processed through logarithmic amplifier 26 to compress the dynamic range of the signal into a logarithmic scale. The resultant logarithmically produced video signal is represented by curve A in FIG. 2. The nearly vertical portions of waveform A occur when the system senses sudden transitions in brightness levels as the scanning beam passes through and beyond a significant boundary line in the original subject. The more gradually sloped portions between the nearly vertical sections of curve A represent brightness gradients which the image orthicon senses between the various boundaries or edges.

The output video signal from logarithmic amplifier 26 is next fed to a differentiator 28. The output signal of differentiator 28 is represented diagrammatically as curve B in FIG. 2. Curve B is a first derivative of the modified video signal. The sharp positive and negative peaks in curve B mark the visual boundaries or edges in the original subject, while the lesser flattened portions of the curve on each side of the zero line correspond to the illumination gradients between significant visual boundaries in the subject. The differentiated signal is next sent through a bottom clipper circuit 30 to remove the flattened or shallow portions of the curve. A signal with the characteristics of curve C results.

Curve C is distinguished by positive and negative pulses of varying amplitudes separated by intervals of zero signal level. The amplitude of each pulse in curve C represents an edge ratio between the brightness of an incremental area of one side of a visual boundary line and the brightness of another closely spaced area immediately on the other side of the boundary line. The polarity of each pulse corresponds to the direction of the brightness change as the beam passes over the edge or boundary line. For example, when the beam scans across a visual boundary line from a darker area to a lighter area, the resulting pulse represented by curve C may be positive, whereas in scanning from a lighter to a darker area across a significant visual boundary, a negative pulse may be produced. The length of the interval between pulses is determined by the amount of time required to scan the original subject from one significant boundary to another.

It is important to understand the full significance of the edge-ratio signal represented by curve C. The spaced positive and negative pulses which comprise this signal do not represent the absolute brightnesses of the different image areas, but instead convey information concerning the relative lightnesses of image components on opposite sides of significant boundary lines. Because of the lightness information which these edge-ratio signals convey, the separate bounded areas of the original subject may be assigned a rank order on a lightness scale.

In the image-formation system illustrated, the edge-ratio signal represented by curve C is employed as a basic command signal in the formation of an image reproducing the original subject. In this example, the edge-ratio signal is transmitted to the image-reproducing portion of the system by means of transmission circuits 32, which may include more-or-less conventional forms of radio frequency modulation and transmission circuitry, and thence to antenna 34. The signal broadcast from antenna 34 is received at a receiving antenna 36 and demodulated by signal receiver circuitry 38 to convert it once again into a form such as is represented by curve C. The transmission circuits 32 and the receiver circuitry 38, together with their associated antennas 34 and 36, are intended in this example to be broadly representative of a transmission channel of any known type. Whether this signal is transmitted over a cable, by wireless means or by any other transmission means, is immaterial to this invention in its broader aspects.

The demodulated edge-ratio signal from circuitry 38 is next fed into an integrator circuit 40 to produce a signal of the type represented by curve D in FIG. 2. Curve D, defined by a series of switched amplitude signals, represents on a logarithmic scale a sequential multiplication of edge ratios to be translated into intensities in the image to be reproduced. It is to be noted that the shape of curve D does not correspond to that of curve A. Curve A represents brightnesses whereas curve D represents lightnesses. The signal represented by curve D is to be translated into another set of brightnesses in the reproduction of the image, but the signification of the brightnesses in the reproduced image is different from that of the brightnesses in the original subject. The gradual brightness variations or gradients between visual edges in the original subject are ignored. It is the edge information itself in the original subject which determines the area brightness in the reproduced image.

Toward this end, the output signal from integrator 40 is passed through an antilog amplifier 42 to restore a broad dynamic range to the signal. The signal then passes through video amplifier 44 to kinescope 46 for controlling the brightness of the image traced on the screen of the kinescope.

Sweep circuits 48 cause the electron beam in the kinescope to scan a raster on the screen in accordance with the same line-scan program employed in the orthicon 14. Sweep circuits 48 are controlled by synchronization circuits 50 which extract from the video amplifier 44 synchronizing or keying impulses to insure proper image relationships between the light and dark areas formed in the reproduced image.

Thus, an image is produced on the screen associated with kinescope 46 in response to edge ratio signals derived from the original subject and transmitted to the image-reproducing portion of the system. The edge-ratio signals represent the degrees of contrast between levels of brightness at closely spaced points on opposite sides of visually significant boundaries which extend between different areas of the original subject. The brightnesses of the different bounded areas of the image correspond to a hierarchy of lightnesses established on the basis of the significant visual boundary lines in the original subject.

Figure 3:
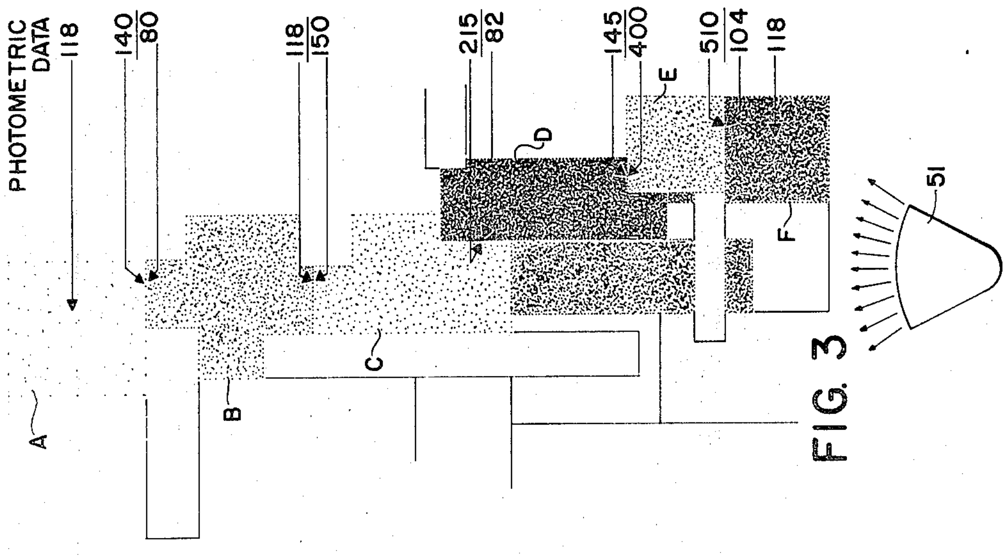
FIG. 3 is a pictorial representation of an experimental arrangement illustrating some of the principles of this invention.

It is appropriate at this point to pause and consider some of the theoretical and experimental foundations upon which this invention is based. In FIG. 3 is represented an actual experimental arrangement making use of an abstract pattern of non-representational grey areas. The various areas of the pattern are made by cutting out and pasting up uniformly grey papers of different luminous reflectance, each having a matte surface. The luminous reflectances are represented in FIG. 3 by the degree of stippling applied to areas A through F in the drawing. The more heavily stippled areas represent those portions of the pattern which have relatively lower reflectance. Each area is surrounded by an arbitrary background. Under uniform illumination the visual observer readily perceives and distinguishes the lighter areas from the darker areas.

This pattern is now illuminated by a single light source 51 placed below it so that there is more light incident on the bottom portions of the pattern than on the top. If the amount of light coming from the dark area F at the bottom is compared with the amount of light coming from the light area A at the top, they are found to reflect the same amount of light to the eyes of the observer. In fact, in this experimental arrangement, the single illuminating light source 51 is placed at such distances from the top and bottom portions as to insure that the same amount of light is reflected from the midpoint of area A as is reflected from the midpoint of area F. Nevertheless, area A still looks light, and area F still looks dark. Any explanation of apparent visual lightness which depends on the amount of light from each point is an image cannot explain this clearly demonstrable point. It is necessary to postulate a different technique of visual information processing to explain the results of this experiment.

The eye needs to know certain invariant properties of the objects which it sees, particularly the efficiencies with which those objects reflect the illumination incident upon them. This efficiency we refer to as luminous reflectance. The eye has a little use for knowing the nature of the ambient illumination, since it varies unpredictably with respect to time and place. The illumination in the natural environment is almost never uniform over the field of view. Shadows are produced by a variety of influences including clouds, trees and the like. These shadows frequently result in an extreme mottling of the illumination incident upon objects within the field of view. Indeed, the variability of illumination in a typical world scene is such that any visual system which generated an image construct based upon a one-to-one correspondence between the luminous energies present in the outside world and the energies utilized directly within the inner visual system would lead to confusion.

The visual system must present a consistent image of its environment. The particular problem of the eye was to develop a mechanism that would make constructs which correspond to the optical nature of objects themselves while utilizing a communicating medium, light, which fluctuates widely and unpredictably in wavelength composition and energy. It would seem, therefore, that the visual mechanism by force of necessity would have to establish a hierarchy of lightness corresponding to luminous reflectance characteristics of objects themselves. This information leading to the rank order of lightnesses within an image area can be gained by a direct comparison of the luminous energies received from points immediately opposite each other across visually significant boundaries.

Further exploration of the nature of the visual construct of a perceived image may be undertaken by considering what appears to be happening within a single bounded region of the pattern shown in FIG. 3. Since the amount of light falling on the pattern continually increases from top to bottom of the pattern, then the amount of light coming from points at the bottom of a single area must be greater than the amounts of light coming from similar points at the top of that area. For example, readings with a spot photometer of just such a pattern illuminated as described above, have shown that the intensity of light from a point at the center of area A is 118 units (specific photometric units are unimportant) and 140 units at the bottom edge of Area A. Despite the wide variation in intensity of luminous energy incident upon area A, it is known that the luminous reflectance of the whole area A is uniform. Observation reveals that area A actually appears uniform to the eye. This leads to what may be called the entity condition: any bounded region of an image tends to appear uniform in lightness, i.e. as an entity, regardless of the luminous energy variations within that region.

If by any technique of image reproduction the intensity of light at each point in area A is reproduced, the total extent of area A will still appear to be of uniform lightness despite the variations of luminous energy in the reproduced image. In order to reproduce the image thus, information is required about the brightness of each and every point within the several image areas being reproduced. However, entity condition implies that the amount of light at each point within a bounded area or entity need not be reproduced to create a similar image effect. It is possible to reproduce area A as a region of uniform brightness and to do so with less total information than would otherwise be required.

In order to reproduce an image of the pattern shown in FIG. 3 with each of the various areas represented by an area of uniform luminous intensity, it is important to select luminous intensities which reproduce all the edge ratios between corresponding areas in the original subject. According to the present invention the information necessary to determine brightnesses is obtained from the sequences of ratios of intensities of light coming from opposite sides of visually significant boundaries. In measuring the boundary between areas A and B in FIG. 3 may be found that a photometer reading of 140 units is obtained from a point in area A just above the boundary, and a reading of 80 units from a point in area B just below the boundary, as shown by the table of photometric data associated with FIG. 3. Upon comparison of these photometer readings with the luminous reflectances of the surface which make up areas A and B, it is found that the ratio of 140 to 80 is equal to the ratio of the known reflectances of areas A and B. The reason for this is that illumination falling on one side of but very close to an edge must be essentially the same as that on the other side of but close to the same edge. In general, it can be assumed that the illumination on opposite sides of a visually significant edge or boundary is essentially the same. If measurements are taken at proximate points on opposite sides of the boundary between areas B and C, this ratio again represents the relative reflectances of areas B and C. In the example shown in the illustration, the ratio is 118 to 150. It is, in fact, possible in this manner to determine the relationship between areas A and B, areas B and C, areas C and D, areas D and E and areas E and F. Despite the fact that within any given one of these areas, the actual measurements of illumination intensity differ greatly, it is nevertheless possible to determine with a high degree of precision the relationships between the luminous reflectances of areas A and F at opposite ends of the illuminated pattern. This may be done by a sequential multiplication of edge brightness ratios, here termed edge ratios. Thus, as the edge ratio between areas A and B is multiplied by that between areas B and C and by each of the respective edge ratios sequentially through areas D, E and F, it may be found from the actual measurements shown in FIG. 3, that a ratio of 6.4 to 1 is obtained. This ratio represents the relative lightnesses of areas A and F, a figure very close to the actual ratio of luminance reflectances of these areas. In similar manner, it is possible to proceed along any path from one area to another crossing boundaries through the pattern represented in FIG. 3 and to determine a number equal to the ratio of luminous reflectances of the first and final areas. In the establishments of the hierarchy of sequential edge ratios to obtain a hierarchy of lightnesses, experimental evidence has been shown that long boundaries are no more important than short boundaries. And again, in the establishment of lightnesses, big areas are no more important than small areas. Area simply does not matter at all. The edge information, however, is important to the eye and the edge or boundary however short or long, must be perceptible, i.e. visually significant, in order to convey the necessary information.

Figure 4:
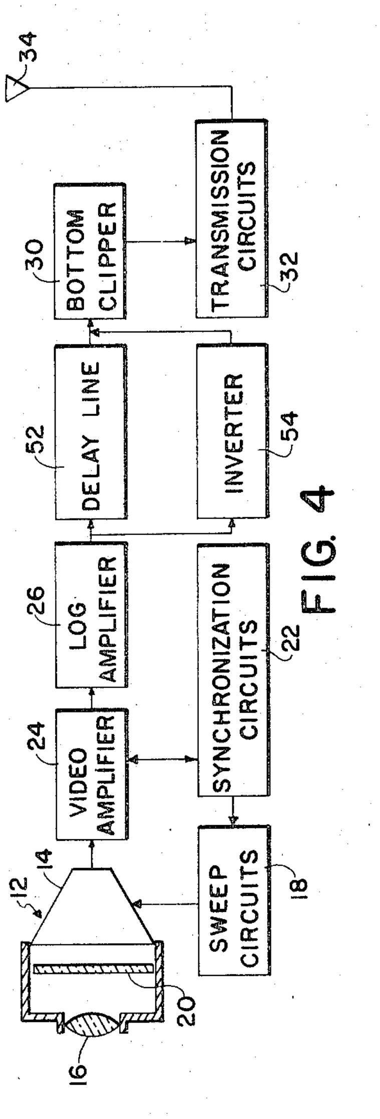
FIG. 4 is a diagrammatic illustration of an alternate television transmission system which may be employed in combination with a receiver such as that shown in FIG. 1 in the practice of this invention.

A signal which characterizes edge ratios and which, by the sequential multiplication of edge ratios is useful for the purpose of reconstructing the lightnesses of different image areas, may be derived otherwise than by the use of a differentiator as shown in FIG. 1. An example of an alternate means for deriving an edge-ratio signal is shown in the transmission circuit illustrated in FIG. 4, wherein circuit components having functions similar to those of FIG. 1 are identified by the same reference numerals. In this embodiment, no differentiator appears between the output end of logarithmic amplifier 26 and the input end of bottom clipper 30. Instead, the out signals from the logarithmic amplifier 26 are fed over branching circuit lines to delay line 52 and to an inverter 54. Both the input ends and the output ends of the delay line 52 and inverter 54 are connected together. Hence, the output signals from these two components are summed algebraically and introduced into the bottom clipper circuit 30. The delay line 52 and inverter 54 need not be in separate sides of the branched circuit, but could be included in a single side thereof.

The net effect of the use of delay line 52 and inverter 54 connected as shown is to subtract the logarithmically amplified video signal from a delayed counterpart of itself. In a television system of this type wherein the video signal represents time-coded positional and brightness information, this is equivalent to comparing the brightnesses of two continuously moving points spaced apart by a predetermined distance. Because of the logarithmic character of the signals, the algebraic sum of the delayed and undelayed signals represents a true ratio of the brightnesses between the two points, not merely a difference in brightness.

In a very real sense, the combination of the effects produced in this circuit by the delay line 52, the inverter 54 and the bottom clipper 30 defines for the system the characteristics of an edge, that is a boundary line which the system treats as visually significant. Visually significant boundary lines are characterized by a significant change in brightness between two spaced apart points. The amplitude above which the bottom clipper 30 passes signals is determinative of what the system treats as a visually significant change in brightness. Another way in which the system could be made sensitive only to visually significant changes in brightness is to remove the bottom clipper 30 and to insert a high band pass filter between the amplifier 26 and the branched circuit of delay line 52 and inverter 54. Such a filter would discriminate against low frequency signals representing gradual changes in brightness and would pass high frequency signals representing sudden transitions at boundaries. The distance between the comparison points determines the sharpness of the boundary line, and hence the brightness gradient which the system treats as visually significant.

The distance between the two points on the image between which brightness ratios are taken is a function of the linear speed of the scanning beam in vidicon 12 and of the absolute duration of the time interval introduced by delay line 52. The delay line 52 may be made adjustable to vary the effective distance between the two points being compared. If the amount of the time delay is reduced to zero, the signal output from the system would also be zero, since the branched circuit including the inverter 54 would then simply subtract the logarithmically amplified video signal from itself. When the delay line 52 produces an appreciable but still short time delay, the combined signal appearing at the input to bottom clipper 30 in FIG. 3 resembles the signal B in FIG. 2. If, however, the time delay produced by delay line 52 is unduly lengthened, thereby representing a comparatively long distance separating the points between which brightness ratios are taken, the signal input to bottom clipper 30 begins to exhibit significant differences.

As a practical matter, circuits employed as differentiators or delay lines include inductive and capacitive elements which, in a poorly designed system, could produce unintended effects. For example, the differentiator included in the system of FIG. 1 should not respond primarily to the slope or rate of change of the brightness signal as the image is being scanned. The rate of change in brightness across a boundary line is a function of the sharpness of the boundary line and not of the ratios of the brightness on opposite sides of the boundary line. In a practical system of this type, therefore, the time constant of the differentiator should be proportioned so that the circuit responds primarily to the changes in signals levels over an appropriate interval rather than to the rate of change between signal levels.

The reactive effects of a delay line, on the other hand, can tend to degrade the true edge-ratio signal by reducing the sharpness of the sudden changes in brightness detected by the system. Reactive effects must, therefore, be balanced to minimize the possibility that the rate of change of brightness on the one hand, or the sharpness of the edge on the other hand, does not exert an undue influence on the edge ratio signal to be derived.

Figure 5:
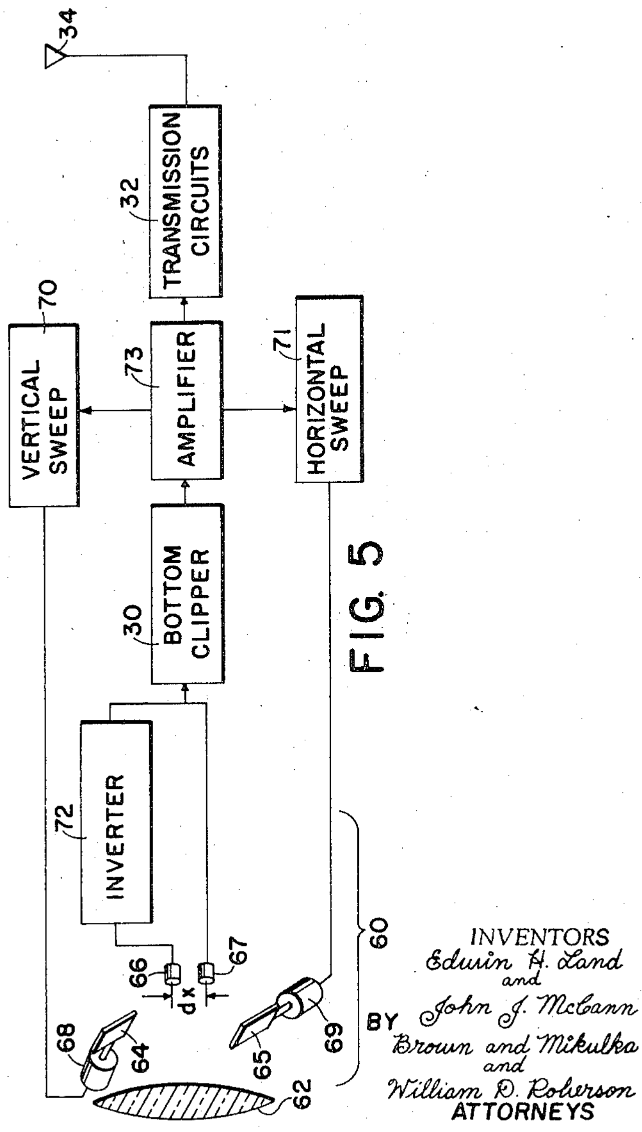
FIG. 5 is a diagrammatic illustration of a still further form of television transmission system useful in the practice of this invention.

An alternate embodiment of the invention which minimizes degradations of the edge-ratio signals by reactive components is shown in FIG. 5. In this example neither delay line nor differentiator is used in the derivation of an edge-ratio signal. Instead of using a conventional television camera for purposes of scanning an original subject, a camera system including an optical imaging and scanning arrangement 60 is employed. The lens, illustrated diagrammatically at 62, forms an image of the subject which is scanned by the combination of vertical scanning mirror 64 and horizontal scanning mirror 65 to direct successive portions of the original image onto two photosensors 66 and 67 respectively spaced apart by a distance *dx*. The scanning movements of mirrors 64 and 65 are effected by motors 68 and 69 under the control of vertical and horizontal sweep circuits 70 and 71 respectively. The photosensors are preferably of a type which generate a signal having a logarithmic characteristic. If the photosensor signals are not logarithmically responsive to the intensity of light incident on the sensors. they should be amplified suitably to obtain a logarithmic characteristic. The polarity of one of the detectors is inverted with respect to that of the other by inverter 72 and the outputs of both are summed. A logarithmic bridge circuit results. As this bridge is caused to scan across an area that is uniformly illuminated and which is of uniform reflectivity, there is no net output from the bridge circuit since both signals are the same and one is the negative of the other. When the pair of detectors reaches and begins to cross a significant visual boundary line between two contiguous areas, one detector reads the amount of light on one side of the boundary line, and the other reads the amount of light on the other side. The output of the bridge circuit is then equivalent to the ratio of edge brightnesses of the two areas. As the pair of detectors is caused to scan beyond the boundary or edge of the second area, the net output of the bridge again drops to zero. What results is a series of edge-ratio signals in pulse from similar to the example given at B in FIG. 2.

These signals are further processed through bottom clipper 30 to obtain edge-ratio signals which do not represent the gradual variations in image brightness which are unassociated with boundaries or edges but which characterize the ratios of brightness between closely spaced incremental areas on opposite sides of visually significant boundary lines separating the different contiguous areas within the field of view of the camera system.

These logarithmic edge-ratio signals, again, are capable of being summed sequentially in an operation which because of the logarithmic character of the signals results in the sequential multiplication of each consecutively detected edge ratio. The result of such a sequential multiplication of the detected edge ratios is the production of lightness signals which characterize the rank order of lightness of each of the respective areas within the field of view of the camera, a rank order which corresponds to the order of lightnesses perceivable by a visual observer. Toward this end the edge-ratio signals are first passed through amplifier 73 wherein synchronization signals are also provided to relate the edge-ratio signals to the line scan program produced by the scanning mirrors 64 and 65. The synchronization signals added by amplifier 73 are also used to control sweep circuits 70 and 71. As in the previous examples given, the sequential multiplication of the edge ratio may be accomplished in the receiver section such as that shown in FIG. 1. There the integrator 40, by summing the logarithmic edge-ratio signals, produces signals which characterize the lightnesses of bounded areas in the field of view.

Figure 6:
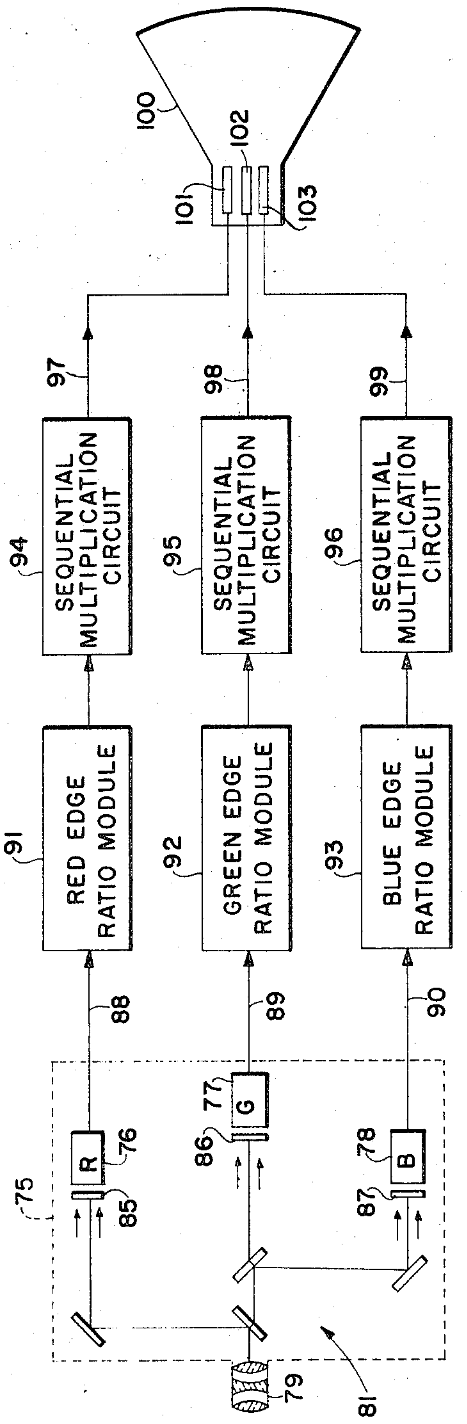
FIG. 6 is a diagrammatic illustration of a television system employing the principles of the invention for the reproduction of colored images.

As was pointed out above in connection with the discussion of FIG. 1, this invention is useful in a system for reproducing colored images. In FIG. 6 is represented a color system which operates by detecting sequential edge ratios in each of three selected spectral regions and sequentially multiplying these edge ratios to determine the color content of the reproduced image. Here, the color television camera assembly 75 may incorporate three conventional image receiving tubes 76, 77 and 78. The lens system 79 directs images of the scene through mirror array 81 onto the face of each of these image receiving tubes. Interposed before the face of the tube 76 is a red filter 85. A green filter 86 is positioned in front of tube 77, and a blue filter 87 is placed before the face of tube 78.

The sweep systems not shown in connection with each of the three image-receiving tubes cause the respective images to be scanned in synchronism to produce a red video signal on line 88, a green video signal on line 89 and a blue video signal on line 90. These signals are passed to respective edge-ratio signal processing modules 91, 92 and 93. Thus, module 91 produces at its output a signal representative of the red edge ratios. that is to say of the edge ratios in the original image as detected within the long wavelength region of the visible spectrum. Module 92 produces green or middle wavelength edge-ratio signals and module 93 produces blue or short wavelength edge-ratio signals. Each of the modules 91, 92 and 93 may obtain its edge-ratio signal in a manner such as that shown, for example, in FIG. 4. That is, each video signal may be given a logarithmic characteristic, subtracted from a delayed counterpart of itself, and passed through a bottom clipper or threshold circuit to produce the desired edge ratio signal.

Thereafter, the edge-ratio color signals from modules 91, 92 and 93 are transmitted for further processing by any desired transmission method to sequential multiplication circuits 94, 95 and 96 respectively. These latter circuits perform an operation on the respective edge-ratio color signals equivalent to the sequential multiplication of the edge ratios. Output signals are produced on lines 97, 98 and 99 which characterize or represent the lightnesses in each of the three selected portions of the spectrum as they would be perceived by a visual observer. Each of the sequential multiplication circuits 94, 95 and 96 may comprise a summing circuit or integrator, such as that shown in the receiver portion FIG. 1, to accumulate the series of positive and negative edge ratio signals processed to them and an antilog amplifier for restoring an appropriate dynamic range to the signals. The lightness-representing signals produced by circuit 94 and appearing on line 97 thus represent the rank order of the lightness of each of the respective areas within the field of view in terms of the red wavelengths. The output signals from circuits 95 and 96 appearing on lines 98 and 99 represent similar information with respect to the green and blue ranges of visible wavelengths. These lightness-representing signals may now be employed to control the luminous intensities of each of three colored images produced on the face of a color kinescope such as that shown at 100. If kinescope 100 is a conventional shadow-mask tube, the red lightness-representing signal may directly modulate the intensity of the electron beam produced by gun 101 to excite the red phosphor. Similarly the green and blue lightness-representing signals would directly control the green gun 102 and the blue gun 103 to excite the respective phosphors.

Certain highly interesting results are achievable with such a system. For example, the color quality of the image produced on kinescope 100 is almost independent of the color balance of the illumination in the original scene. Fluctuations in the quality of illumination on the original scene need not affect the quality of the produced image which is a stable, constant and reliable reproduction of the color characteristics of the original scene regardless of the nature of the illumination incident thereon. This system may be regarded as a color image-reproducing system of great latitude in each of its color components. If, for example, the illumination in the original scene begins to be deficient or to decline in, say, the blue wavelengths, the color quality of the image reproduced on the face of tube 100 need not change at all, since the edge ratios detected within each spectral range remain the same. This desirable result is a consequence of the sequential multiplication of edge-ratio signals which are not of themselves dependent on the absolute intensity of the original illumination in any of the spectral regions with which the scene is lit.

The invention and certain methods of its practice have been illustrated in connection with certain forms of television system, a currently preferred mode of implementation. It should be clear, however, that the principles of this invention are also applicable to other types of image-reproducing systems. For example, the image display obtained on the face of a kinescope may be captured photographically to obtain a photographic image of the original subject. In a broader sense, a television system is representative of means capable of detecting edge ratios and sequentially multiplying them to obtain a visible image wherein the intensity of the light which is directed to the vision of an observer from each area of the image is governed, not by the intensities of light actually available from the respective areas in the original field of view, but by the rank order of lightnesses perceivable by a visual observer in the original scene.

Since the invention may be practiced in modified form by a variety of methods and systems, it is intended that all matter contained in the above description or shown in the accompanying drawings shall be interpreted as illustrative and not in a limiting sense.

We claim:

1. The method of reproducing an image of a subject which comprises:

detecting the brightness ratios between closely spaced points on opposite sides of visually significant boundaries between different areas of said subject; and reproducing an image of said subject in which the relative brightnesses between different image areas corresponding to said subject areas is determined by the sequential multiplication of said brightness ratios.

2. The method of reproducing an image of a subject exhibiting in at least a predetermined range of wavelengths brightness differences in different areas of said subject, which method comprises:

detecting the brightness ratios between closely spaced incremental areas on opposite sides of visually significant boundaries between said subject areas; and reproducing an image having different image areas corresponding to those of said subject areas, the relative brightnesses of said image areas being determined by the aforesaid brightness ratios.

3. The method of reproducing an image of a subject exhibiting in at least a predetermined range of wavelengths brightness differences in different areas of said subject, which method comprises:

detecting the brightness ratios between closely spaced incremental areas on opposite sides of visually significant boundaries between said subject areas;

sequentially multiplying the brightness ratios detected across said boundaries to determine a rank order of lightnesses corresponding to the respective areas of said subject; and reproducing an image of said subject in which the brightness of the respective image areas is determined by the rank of the corresponding subject areas in said order of lightnesses.

4. The method of reproducing an image of the contents of a visual field of view exhibiting brightness differences within at least a predetermined range of spectral energies in different areas of said field of view, which method comprises:

detecting, within said range of spectral energies, the edge brightness ratios between spaced-apart points on opposite sides of visually significant boundaries between said areas; and reproducing an image having different image areas corresponding to respective areas in said field of view, the relative brightness of said image areas being determined by said edge brightness ratios.

5. An image reproduction system comprising:

means for deriving from a subject information representing the edge ratios between levels of brightness at closely adjacent points of said subject on opposite sides of significant visual boundaries; and means responsive to said edge-ratio-representing information for reproducing an image of said subject.

6. An image reproduction system comprising:

means for deriving from a subject an edge-ratio signal representing the ratios between levels of brightness at closely spaced points on opposite sides of visually significant boundaries between different areas of said subject; and means responsive to said edge-ratio signal for reproducing an image of said subject.

7. An image reproduction system comprising:

means for scanning a subject according to a predetermined line scan program and for producing an edge-ratio signal representative of the ratios between levels of brightness at closely spaced points on opposite sides of significant visual boundaries between different areas of said subject; and means responsive to said edge-ratio signal for reproducing an image of said subject.

8. An image reproduction system comprising:

means for deriving from a field of view edge-ratio signals representing the ratios of brightness between closely spaced incremental areas on opposite sides of visually significant boundaries separating different areas within said field of view;

means responsive to said edge-ratio signals for developing lightness-determining signals derived from the sequential multiplication of said ratios, said lightness-determining signals characterizing the rank order of the lightness of respective areas within said field of view as perceived by a visual observer; and means responsive to said lightness-determining signals for reproducing an image of said field of view.

9, An image reproduction system comprising:

means for scanning a subject according to a predetermined line scan program to produce brightness signals representative of brightness variations from point-to-point of said subject;

means responsive to said brightness signals for producing edge-ratio signals representative of the ratios between levels of brightness at closely spaced points on opposite sides of significant visual boundaries of said subject; and means responsive to said edge-ratio signals for reproducing an image of said subject in accordance with said line scan program.

10. An image reproduction system comprising:

means for scanning a subject according to a predetermined line scan program to produce brightness signals representative of brightness variations from point-to-point of said subject;

means responsive to said brightness signal for producing an edge-ratio signal representative of the ratios between levels of brightness at closely spaced points on opposite sides of significant visual boundaries of said subject;

means for processing said edge-ratio signals to develop lightness-representing signals derived from the multiplication of sequentially detected edge brightness ratios, said lightness-representing signals representing for each bounded area of said subject a rank in a scale of lightnesses; and means responsive to said lightness-representing signals for reproducing an image of said subject in which the various bounded areas of said image are rendered in terms of brightnesses corresponding to the rank of the corresponding subject areas in said scale of lightnesses.

11. A television system comprising:

camera means for deriving from the scan of an original subject according to a predetermined line scan program brightness signals representing continuous records of the brightness of each incremental areas scanned on said original subject;

signal processing means responsive to said brightness signals for producing edge-ratio signals characterizing changes in brightness of the original subject across significant visual boundaries but not characterizing gradual changes in brightness unassociated with significant visual boundaries; and means responsive to said edge-ratio signals for reproducing an image of said original subject and for controlling the brightness of image areas between image boundaries in accordance with the changes in brightness characterized by said edge-ratio signals.

12. A television system comprising:

camera means for deriving from the scan of an original subject according to a predetermined line scan program brightness signals representing continuous records of the brightness of each incremental area scanned on said original subject;

signal processing means responsive to said brightness signals for producing edge-ratio signals characterizing changes in brightness of the original subject across significant visual boundaries but not characterizing gradual changes in brightness unassociated with significant visual boundaries;

means responsive to said edge-ratio signals for producing a signal representing lightness for each subject area between significant visual boundaries; and image display means responsive to said lightness-representing signals for producing an image of said subject.

13. A television system comprising:

camera means for deriving from the scan of a field of view according to a predetermined line scan program brightness signals representing continuous records of the brightness of each incremental area scanned in said field of view;

signal processing means responsive to said brightness signals for producing edge-ratio signals characterizing the ratios of brightness between closely spaced incremental areas on opposite sides of visually significant boundaries separating different areas within said field of view but not characterizing gradual changes in brightness unassociated with significant visual boundaries;

means responsive to said edge-ratio signals for developing lightness-representing signals derived from the sequential multiplication of said ratios, said lightness-representing signals characterizing the rank order of the lightness of respective areas within said field of view as perceived by a visual observer; and image display means responsive to said lightness-representing signals for producing an image of said field of view.

14. The television system of claim 13 wherein said image display means includes means for controlling the brightness of each of the respective areas of the image displayed thereby in accordance with the rank order of lightness of the corresponding area in said field of view as characterized by said lightness-representing signals whether or not said rank order of lightness corresponds to the scale of brightness of the respective areas of said field of view.

15. The method of reproducing a colored image of the contents of a visual field of view exhibiting brightness differences within separate predetermined ranges of spectral energies in different areas of said field of view, which method comprises:

detecting, within each of said ranges of spectral energies, the edge brightness ratios between spaced-apart points on opposite sides of visually significant boundaries between said areas; and reproducing a colored image having different image areas corresponding to said areas of said field of view, the relative brightnesses and colors of said image areas being determined by said edge brightness ratios.

16. The method of reproducing a colored image of a subject which method comprises:

detecting in each of a plurality of different spectral ranges, the edge ratios between the brightnesses of closely spaced incremental areas on opposite sides of visually significant boundaries between said subject areas;

sequentially multiplying said edge ratios corresponding to respective ones of said spectral ranges to determine for each of the respective areas of said subject a rank order of lightnesses in each of said spectral ranges; and reproducing an image of said subject in which the relative brightnesses and colors of the respective image areas are determined by the rank orders of lightness of the corresponding subject areas in each of said spectral ranges.

17. An image reproduction system for reproducing colored images comprising:

means for deriving from a field of view edge-ratio color signals representing within each of a plurality of spectral ranges the ratios of brightness between closely spaced incremental areas on opposite sides of visually significant boundaries separating different areas within said field of view;

means responsive to said edge-ratio color signals for developing lightness-representing color signals derived from the sequential multiplication of the edge ratios corresponding to each os said spectral ranges, said lightness-representing signals characterizing the rank order of the lightnesses of respective areas within said field of view as perceivable by a visual observer for each of said spectral ranges; and means responsive to said lightness-representing signals for reproducing a colored image of said field of view in terms of a plurality of separate visual stimuli having different wavelength composition, the relative intensities of each one of said visual stimuli being governed by a respective one of said lightness-representing color signals.